Feb. 8, 1955

J. W. LIGHT 2,701,552

ACTUATOR CONTROL SYSTEM AND VALVE MECHANISM THEREFOR

Filed May 28, 1953

INVENTOR.
James W. Light
BY

Graig V. Morton
Attorney

Feb. 8, 1955   J. W. LIGHT   2,701,552
ACTUATOR CONTROL SYSTEM AND VALVE MECHANISM THEREFOR
Filed May 28, 1953

INVENTOR.
James W. Light
BY
Craig V. Morton
Attorney

United States Patent Office 2,701,552
Patented Feb. 8, 1955

2,701,552

ACTUATOR CONTROL SYSTEM AND VALVE MECHANISM THEREFOR

James W. Light, Greenville, Ohio, assignor to General Motors Corporation, Detroit, Mich., a corporation of Delaware Application May 28, 1953, Serial No. 358,039

10 Claims. (Cl. 121—40)

This invention pertains to an actuator control system, and more particularly to a control system for a fluid pressure operated, self-locking actuator.

Technological advances in aircraft have necessitated the usage of self-locking actuators for moving aircraft control surfaces and accessories. The advent of the self-locking, fluid pressure operated actuator, in turn, necessitated the development of a control system so that the advantages of self-locking actuators could be realized. This invention provides a control system for an actuator of the aforesaid character including a valve assembly automatically operable to perform the following sequence of steps upon manual actuation of a control member: initially, the mechanically locked actuator piston is restrained against movement by trapping fluid in the actuator cylinder; thereafter, the mechanical locking means are released; and finally, fluid under pressure is admitted to the actuator cylinder on one side of the piston while the other side of the piston thereof is connected to drain. Accordingly, among my objects are the provision of an actuator control system having valve means for controlling the flow of fluid to and from a self-locking, fluid pressure operated actuator, and the further provision of a unitary valve assembly for accomplishing the aforementioned operational sequence.

The aforementioned and other objects are accomplished in the present invention by providing a plurality of servo-actuated valves which are operable at predetermined, different pressure potentials. Specifically, the actuator control system includes a source of fluid pressure, a four-way manually operable selector valve for determining the direction of actuator movement, and a unitary servo-actuated valve assembly having connection with the manually operable valve and the actuator. The actuator, per se, may be of the basic self-locking, fluid pressure operated type, as disclosed in copending application Serial No. 394,660, filed November 27, 1953, a continuation of abandoned application, Ser. No. 78,412, filed February 25, 1949, in the name of Howard M. Geyer, or of the dual drive, self-locking type disclosed in Patent No. 2,620,683 to Howard M. Geyer. However, the specific control system disclosed herein is particularly adapted for use in conjunction with the latter type of actuator for a reason which will later be apparent.

For a better understanding of this invention, it is deemed necessary to refer generally to the more salient features of both actuator types. Actuators of both types include a cylinder which encloses a reciprocally movable piston having an extending rod portion. The piston is operably connected to a first member in the cylinder, the first member having threaded engagement with a second member in the cylinder. One of the members is constrained for reciprocal movement with the piston, and reciprocal movement of the piston can only be accomplished upon relative rotation between the two members. One of the members is supported for rotation within the cylinder, and this member may, or may not, be constrained for lineal movement with the piston. The self-locking feature is achieved by providing spring biased, fluid pressure releasable, mechanical locking means for restraining rotation of the rotatable member. In the dual drive actuator type, rotary driving means are connectable to the rotatable member to accomplish reciprocal piston movement in lieu of fluid pressure actuation. Moreover, in the dual drive actuator type, both members may be rotatably supported within the cylinder, but in any event, relative rotation between the two members is necessary to effect linear movement of the piston.

The unitary servo-actuated valve assembly includes a shuttle valve, and three spring loaded plunger valves. Two of the plunger valves are of identical construction and have two operative positions. These two plunger valves have connection with the actuator cylinder on opposite sides of the piston and are spring loaded such that they respond to a rather low pressure potential supplied from the manually operable selector valve, as directed by the third plunger valve. The first operative position of these two valves traps fluid within the cylinder on both sides of the piston, thereby establishing a fluid lock. The third plunger valve is connected to the mechanical lock release means, and is spring biased to move only upon the attainment of a predetermined pressure. The first two plunger valves are further constructed and arranged to move upon the attainment of a high pressure to a second operative position where they connect the cylinder chamber on one side of the piston to source of pressure and concurrently connect the cylinder chamber on the other side of the piston to drain as determined by the shuttle valve under the control of the manually operable selector valve.

Further objects and advantages of the present invention will be apparent from the following description, reference being had to the acompanying drawings wherein a preferred embodiment of the present invention is clearly shown.

Figure 1:
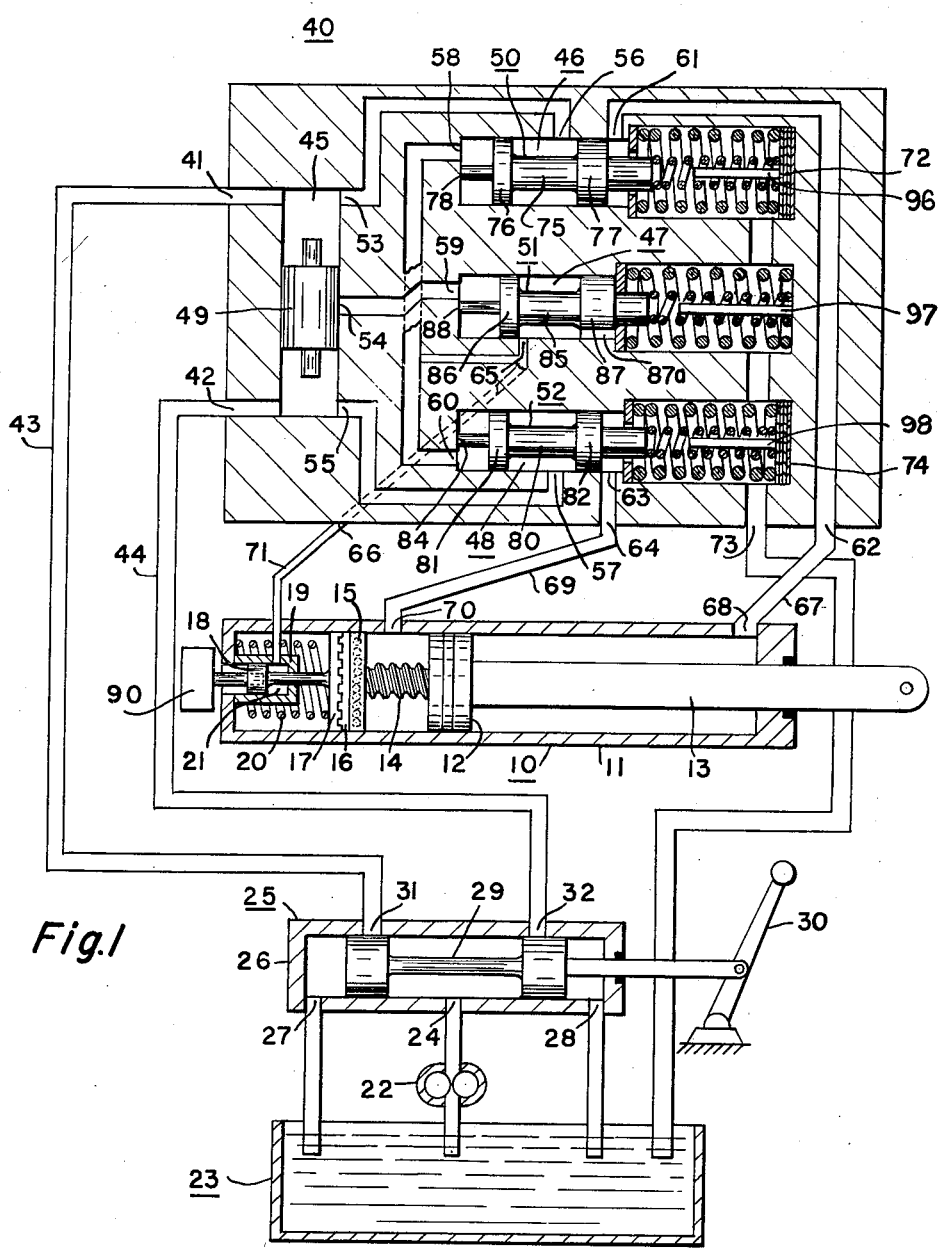
Fig. 1 is a schematic view of an actuator control system constructed according to this invention.

With particular reference to Fig. 1, the actuator control system is depicted in conjunction with an actuator 10 shown schematically as including a cylinder 11 within which a lineally movable piston 12 is disposed for fluid pressure actuation in either direction. The piston 12 is shown having connection with a rod 13 which projects through an end wall of the cylinder 11, the free end of the rod being adapted for connection to any suitable load device, not shown. A screw shaft 14 is rotatably supported within the cylinder 11 by means of bearings 15, the screw shaft extending through the piston 12 for threaded engagement therewith, and into a hollowed out portion of the piston rod 13, not shown. The bearing supported portion, or collar, 16 of the screw shaft 14 is provided with a serrated edge forming one part of a dog toothed type clutch, the other portion of the clutch being formed by a normally non-rotatable but lineally movable collar 17. As is shown in Fig. 1, the collar 17 is operatively connected by means of a rod to a servo piston 18 disposed within a second cylinder 19. The collar 17 is normally urged into locking engagement with the bearing collar of the screw shaft by means of a spring 20. When the toothed portions of the collars 16 and 17 are in engagement, rotation of the screw shaft 14 is prevented and, consequently, linear movement of the piston 12 is precluded since linear movement of the piston 12 can only be effected if screw shaft 14 is free to rotate, it being understood that the projecting piston rod 13 prevents rotation of the piston 12.

The actuator structure is termed self-locking, inasmuch as spring means are employed to normally restrain rotation of the screw shaft and consequent linear movement of the piston. The locking means may be released by the application of fluid pressure to servo chamber 21 of the cylinder 19, thus, effecting movement of the piston 18 and locking collar 17 to the left, as viewed in Fig. 1, thereby freeing the collar 16 and the screw shaft 14 for rotation. In actual practice, the connection between the screw shaft 14 and the piston 12 is effected by a ball-nut arrangement, such as disclosed in the aforementioned application and patent. Moreover, in accordance with the teachings of the aforesaid patent, the actuator construction may be modified so that piston movement may be effected by either the application of fluid pressure, or by directly rotating the shaft 14 by means of a rotary power device, such as a reversible electric motor 90 having connection with the collar 17. The electric motor includes brake means that preclude rotation of the collar 17 when the motor is deenergized. The brake means may be of the type shown in the aforementioned patent to H. M. Geyer, 2,620,683.

The actuator control system further includes a source of pressure 22, which, in this instance, partakes the form of a pump having an inlet connection communicating with a reservoir 23, and an outlet connection with a supply port 24 of a manually operable, four-way selector valve 25. The selector valve 25 includes a housing 26 having drain ports 27 and 28 adjacent the ends thereof and a supply port 24 medially disposed therebetween. A two-land plunger 29 is disposed within the housing 26 and is adapted for reciprocal movement under the control of a manual lever 30. The two lands of the plunger cooperate with control ports 31 and 32 formed within the housing 26. In the neutral position of the plunger 29, the lands thereof block communication between either of the control ports 31 and 32 and the supply port 24, or the drain ports 27 and 28.

Figure 2:
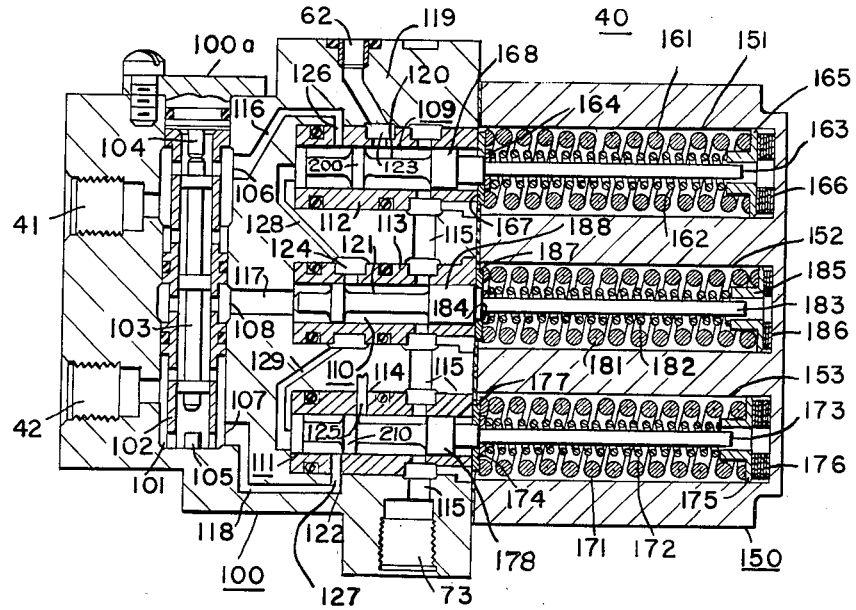
Fig. 2 is a longitudinal, sectional view of the unitary valve assembly taken on line 2—2 of Fig. 3.
Figure 3:
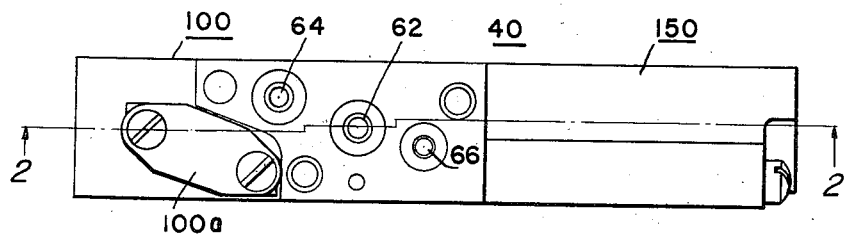
Fig. 3 is a top view, in elevation, of the unitary valve assembly.

A unitary servo actuated valve assembly is indicated generally by the numeral 40 in the drawings, the valve assembly being shown in schematic form in Fig. 1, and structurally in Figs. 2 and 3. The unitary valve assembly, as shown in Fig. 1, comprises a casing having a pair of inlet ports 41 and 42 which are respectively connected by conduits 43 and 44 to control ports 31 and 32 of the selector valve 25. The valve casing is further formed with a plurality of chambers 45, 46, 47 and 48. A pressure responsive valve element 49 is situated in chamber 45. Two-land plungers 50, 51 and 52 are disposed, respectively, in chambers 46, 47 and 48. Chamber 45 includes three outlet ports 53, 54 and 55. Outlet port 53 is disposed adjacent inlet port 41 and is connected by a passage within the casing to an inlet port 56 of the chamber 46, and outlet port 55 is disposed adjacent inlet port 42 and is connected by a passage to inlet port 57 of chamber 48. Outlet port 54 is connected by a passage means to port 59. In addition, chamber 46 has an outlet port 61 connected by passage means to an outlet port 62 of the valve casing, while chamber 48 includes an outlet port 63 connected by passage means to an outlet port 64 of the valve casing. Chamber 47 includes an outlet port 65 connected by passage means to an outlet port 66 of the valve casing. In addition, the outlet port 65 is connected by passage means to ports 58 and 60 of chambers 46 and 48.

The outlet port 62 is connected by a conduit 67 to a retract port 68 of the actuator cylinder 11. The outlet port 64 is connected by a conduit 69 to an extend port 70 of the actuator cylinder. The outlet port 66 is connected by a conduit 71 to the servo chamber 21 of the brake, or lock releasing cylinder, 19.

The plungers 50, 51 and 52 are constructed and arranged for servo actuation. The chambers 46, 47 and 48 include stepped portions with the plungers being disposed in the smaller diameter portion. In addition, the plungers have extending rod portions which extend into the larger diameter portions of the chambers. A pair of nested compression springs are disposed in each of the larger diameter portions of the chambers 46, 47 and 48, which chambers also have disposed therein stop rods 96, 97 and 98 for limiting movement of plungers 50, 51 and 52, respectively, to the right as viewed in Fig. 1. The larger diameter springs seat, respectively, against the end walls of the chambers and collars resting against the shoulders separating the smaller and larger diameter chambers. The smaller diameter springs have ends seating, respectively, against the ends of the larger diameter chambers and the ends of the extending rods of the plungers 50, 51 and 52. The springs in the larger diameter portions of chambers 46 and 48 are shimmed at 72 and 74, to preload the springs disposed therein.

Plungers 50 and 52 are of identical construction and, accordingly, a description of one is deemed to be sufficient. Plunger 50 includes a rod portion 75 having a pair of spaced lands 76 and 77 and an axial abutment 78. The smaller diameter spring engages the rod portion 75 and normally urges the plunger 50 to the position shown in Fig. 1. In a similar manner, plunger 52 includes a rod portion 80 having lands 81 and 82 and an axial abutment 84. It should be noted that in connection with plungers 50 and 52, a predetermined movement of these plungers can be effected before lands 77 and 82 thereof come into contact with the collar seat of the larger diameter springs in the chambers 46 and 48. Plunger 51 includes a rod portion 85 having lands 86 and 87 and an axial abutment 88. However, the axial abutment 88 is of such an extent that the land 87 is always in engagement with the collar seat for the larger diameter spring in chamber 47, and, accordingly, movement of plunger 51 will necessitate the compression of both springs within the chamber 47. The larger diameter portions of the chambers 46, 47 and 48 are interconnected by a passage means, that connect with a drain port 73, which, as illustrated in Fig. 1, may be connected to the reservoir 23, or back pressure supply.

With particular reference to Figs. 2 and 3, the structural embodiment of the unitary valve assembly 40 will next be described. Structurally, the unitary valve assembly 40 includes a pair of housings 100 and 150, which are assembled by any suitable means, not shown. Housing 100 is formed with inlet ports 41 and 42, outlet ports 62, 64 and 66, and drain port 73. In addition, housing 100 is formed with a circular recess 101, the open end of which is closed by a plate member 100a, the recess 101 forming a shuttle valve chamber. A ported sleeve 102 is fixedly supported within the recess 101, within which a three-land shuttle valve element 103 is situated. The shuttle valve is movable under the urge of fluid pressure between predetermined limits, as defined by stops 104 and 105. The recess 101 is further formed with three outlet ports 106, 107 and 108, which are equivalent, operationwise, to the outlet ports 53, 54 and 55 of the schematic illustration in Fig. 1.

The housing 100 further includes bored portions 109, 110 and 111, which form the smaller diameter portions of the chambers 46, 47 and 48, depicted in Fig. 1. Porting sleeves 112, 113 and 114 are fixedly retained in each of bores 109, 110 and 111. Moreover, the bores 109, 110 and 111 are interconnected by a passage 115 to the drain port 73. Each of the sleeves 112, 113 and 114 includes a drain port having connection with passage 115 and an outlet port having connection with one of the three outlet ports of the housing 100. Thus, the outlet port 123 of valve sleeve 112 is connected by passage means 119 to the outlet port 62; the outlet port 124 of the valve sleeve 113 is connected by passage means, not shown, to the outlet port 66; and the outlet port 125 of sleeve 114 is connected by passage means, not shown, to the outlet port 64.

Passage means 116 connect shuttle valve outlet port 106 with inlet port 126 of the valve sleeve 112; passage means 117 connect the bore 110 with shuttle valve port 108; and passage means 118 connect the shuttle valve port 107 with inlet port 127 of valve sleeve 114. Three-land valve plungers 120, 121 and 122, respectively, are disposed for reciprocal movement within valve sleeves 112, 113 and 114. Plunger 121 may be moved to the right, as viewed in Fig. 2, by means of pressure fluid admitted to the bore 110 from port 108 of the shuttle valve through passage means 117. Outlet port 124 of the valve sleeve 113 is connected by passage means 128 to the bore 109 and by passage means 129 to the bore 111, and, accordingly, the valve plungers 120 and 122 may be moved to the right by pressure fluid admitted to the bores 109 and 111 from outlet port 124.

Housing 150 includes three bores 151, 152 and 153, which are concentric with and larger than the bores 109, 110 and 111 of the housing 100. The bore 151 contains a pair of coaxially disposed springs 161 and 162. The smaller spring 162 is supported by a spring guide 163 and has ends seating on a collar 164 abutting one end of plunger 120 and on a spring seat 165. Spring seat 165 is positioned within the bore 151 to preload the springs 161 and 162 by means of shims 166. The spring 162 normally urges the plunger 120 to the position shown in Fig. 2. One end of the larger spring 161 rests against the spring seat 165, the other end of the spring resting against a collar 167 which abuts the end of valve sleeve 112. Thus, initial movement of the valve plunger 120 is resisted only by smaller spring 162 until the edge of land 168 abuts collar 167.

In a similar manner, bore 153 contains a pair of coaxially disposed springs 171 and 172, a spring guide 173, a collar 174 which abuts the end of plunger 122, a spring seat 175, shims 176 and a collar 177 which abuts the end of sleeve 114. Spring 172 normally maintains plunger 122 in the position shown in Fig. 2, and initial movement of the plunger 122 to the right is again resisted only by spring 172. Spring 171 does not resist movement of the plunger 122 until the edge of land 178 abuts the collar 177.

Bore 152 also contains a pair of coaxial springs 181 and 182, a spring guide 183, a collar 184 abutting the end of plunger 121, a spring seat 185, a lesser number of shims 186 and a collar 187 abutting the edge of valve sleeve 113. However, land 188 of plunger 121 is of different configuration than lands 168 and 178 of plungers 120 and 122, respectively, so that any movement of the plunger 121 to the right is resisted by both of springs 181 and 182.

*Operation*

The operation will first be described in connection with the schematic illustration of the actuator control system, shown in Fig. 1. If the operator desires to extend the actuator piston rod 13, the lever 30 is moved about its pivot in the counterclockwise direction so as to move plunger 29 to the right. Movement of plunger 29 to the right will result in the application of high pressure fluid from the pump 22 through the port 24, the port 32, the conduit 44, to the port 42 of the shuttle valve chamber 45. Port 41 of the shuttle valve chamber 45 will be connected to drain through conduit 43, port 31, and port 27. The application of high pressure fluid to port 42 and the concurrent connection of port 41 to drain will effect movement of the shuttle valve element 41 upwardly, as viewed in Fig. 1.

The shuttle valve element 49 will be moved to a position where high pressure fluid will be applied to outlet ports 54 and 55 of the shuttle valve chamber 45 so that high pressure fluid will be applied to the inlet port 59 of chamber 47 and the supply port 57 of chamber 48. The application of high pressure fluid to the end of chamber 47 will effect movement of the plunger 51, the pressure required to effect movement of the plunger 51 being determined by the preload of the springs in the larger diameter portion of chamber 47. When the pressure potential reaches the predetermined value, for instance 1700 p. s. i., plunger 51 will be moved to a position where ports 59 and 65 will be interconnected and pressure fluid will be admitted to servo chamber 21 of the brake releasing means through port 66 and conduit 71. Simultaneously, with the application of pressure fluid to the servo chamber 21, pressure fluid will be admitted to ports 58 and 60 of chambers 46 and 48.

The actuator 10 is constructed so that the spring 20 is of greater strength than the springs resisting movement of plungers 50 and 52. Accordingly, the pressure applied to chambers 46 and 48 through ports 58 and 60 will effect movement of the plungers 50 and 52 to a position where lands 77 and 83, respectively, cover ports 61 and 63. A pressure potential of 400 p. s. i., for example, may be sufficient. Thus, the first step in the sequence of actuator control is performed, namely fluid in the actuator chambers on both sides of the piston 12 is trapped therein. Thus, the actuator may be said to be locked by trapping fluid within the cylinder, and where the fluid employed is oil, the actuator is hydraulically locked.

By reason of the fact that no fluid can escape from the system thus far described, the pressure potential continues to increase until the pressure supplied to servo chamber 21 attains a value, for example 1750 p. s. i., sufficient to overcome the thrust of spring 20, at which time, the second step in the sequence of actuator control is performed, namely the mechanical locking means for the screw shaft 14 is released. Thus, when the pressure in servo chamber 21 exceeds the thrust of spring 20, the mechanical braking means of the actuator, namely the toothed clutch members 16 and 17 are disengaged by movement of the member 17 to the left, as viewed in Fig. 1, thus, freeing the screw shaft 14 for rotation.

The system still being closed, the pressure potential continues to increase in the chambers 46 and 48, thereby effecting continued movement of the plungers 50 and 52, which is now resisted by both the smaller and larger springs, until the lands 77 and 83 of the plungers are in such a position that ports 56 and 61 of chamber 46, and ports 57 and 63 of chamber 48 are interconnected, plungers 50, 51 and 52 at this time engaging stop rods 96, 97 and 98, respectively. This final operation may require a pressure potential on the order of 1800 p. s. i.

In this manner, the final step in the sequence of actuator control is performed inasmuch as fluid under pressure is admitted from port 57 through port 63 and port 64, conduit 69 and port 70 to the extend actuator chamber, while the retract actuator chamber is connected to drain through port 68, port 62, port 61, port 56 and port 53 of the shuttle valve chamber 45.

When the desired movement of the actuator has been achieved, the lever 30 is moved to the position shown in the drawing whereupon the pressure communicated through ports 58 and 60 to the servo chambers 46 and 48 drops to a value below 1750 p. s. i. The springs will then move the plungers 50 and 52 to a position where lands 77 and 83 cover ports 61 and 63, respectively, whereby the actuator 10 is again hydraulically locked. Continued diminution of pressure, below a potential of 1650 p. s. i., in the servo chamber 47, results in movement of plunger 51 to a position where port 65 is connected to drain through opening 87a and port 73. Thus, the brake servo cylinder is ported to drain and the spring 20 urges collar 17 into engagement with the collar 16 to mechanically lock the actuator screw shaft 14. Thereafter, the pressure potential in chambers 46 and 48 drops below 400 p. s. i. and the springs move plungers 50 and 52 to the positions of Fig. 1, whereupon the actuator chambers are connected through port 73. It is to be understood that a minimum back pressure is at all times maintained at the drain port 73 to maintain the actuator chambers filled with fluid.

If the operator desires to retract the actuator, the lever 30 is moved in a clockwise direction about its pivot, thereby resulting in movement of plunger 29 to the left whereupon the sequence of events, heretofore described, is repeated.

The unitary valve assembly 40, shown structurally in Fig. 2, performs in a manner identical to the schematic showing in Fig. 1. Thus, for example, if port 41 is connected to high pressure fluid and port 42 is connected to drain, or back pressure, the shuttle valve element 103 will move downwardly, in Fig. 2, against the stop 105. In this instance, pressure fluid will be admitted through port 108 and passage 117 behind the plunger 121 in the bore 110, which pressure potential will effect movemnt of the plunger 121 to the right compressing the springs 181 and 182 until pressure fluid is supplied to port 124. Port 124 is connected to the lock releasing servo cylinder of the actuator and is also connected by passages 128 and 129 to chambers 109 and 111 behind the plungers 121 and 122. As the lock energizing spring of the actuator is stronger than spring 161 and spring 171, the plungers 120 and 122 will move to the right to a position where lands 200 and 210, respectively, will cover ports 123 and 125, thereby trapping fluid in the actuator to establish a fluid lock. At this time, movement of the plungers 120 and 122 is resisted by springs 161 and 162, and 171 and 172, respectively, which springs are stronger than the actuator locking spring and, accordingly, the mechanical locking means of the actuator will be released. A continued increase in the pressure potential applied to servo chambers 109 and 111 will result in further movement to the right of plungers 120 and 122 until ports 123 and 126 of valve sleeve 112 are interconnected, and ports 125 and 127 of valve sleeve 114 are connected whereupon pressure fluid will be supplied to one of the actuator chambers, while the other actuator chamber is connected to drain.

The sequence of events which transpires upon movement of the manual control valve to the neutral or off position, as shown in Fig. 1, is again the same as that discussed in connection with the schematic showing of the valve unit 40 of Fig. 1. Thus, when pressure fluid is no longer supplied to port 41, the springs 161 and 162, and 171 and 172 will move their respective plungers 120 and 122 to a position where lands 200 and 210, respectively, close ports 123 and 125, thus, trapping fluid in the actuator cylinder. Continued reduction of pressure in servo chamber 110 will result in connecting actuator locking chamber to drain through passage 115 and port 173 whereupon the spring again mechanically locks the actuator, and a still further reduction in the pressure applied to the servo chambers 109 and 111 will result in the plungers 120 and 122 assuming the positions shown in Figure 2 whereupon the actuator chambers will be connected to drain. It should be noted that the spring chambers of housing 150 are at all times interconnected with the drain passage 115 and the drain port 73 by reason of passages provided between the valve sleeves 112, 113 and 114 and the bores 109, 110 and 111.

If the actuator 10 is of the dual drive type, in accordance with the aforementioned Patent No. 2,620,683, with the servo valves of the valve assembly 40 in the position of Figs. 1 or 2, the piston 12 may be reciprocated upon rotation of screw shaft 14. By reason of the fact that both actuator chambers are connected to drain, and by reason of a minimum back pressure being maintained in the drain line connected with port 73, by any suitable back pressure valve means, not shown, such as the type disclosed in the Herman et al. Patent No. 2,328,979, piston reciprocation caused by rotation of screw shaft 14 by the rotary power means will not exhaust fluid in the actuator chambers, which are maintained full of fluid at all times.

The operation of the mechanism disclosed herein is identical with that disclosed in my copending application, Serial No. 338,348, filed February 24, 1953.

While the embodiment of the present invention as herein disclosed, constitutes a preferred form, it is to be understood that other forms might be adopted.

What is claimed is as follows:

1. A control system for a fluid pressure operated actuator having a cylinder with a lineally movable member therein capable of fluid pressure actuation in either direction and releasable locking means normally operative to restrain movement of said member in the absence of fluid pressure actuation, including in combination, a source of fluid pressure; valve means operable to trap fluid in said cylinder to prevent movement of said member comprising a pair of servo actuated plunger valves having connection with the source, the actuator cylinder on opposite sides of said member, and with a drain conduit; valve means operable to admit fluid under pressure from said source to release said locking means while the actuator member is held against movement by the fluid trapped in said cylinder by the first recited valve means; and valve means operable to admit fluid under pressure to said cylinder on either side of said member and connecting the other side of said cylinder to drain to effect movement of said member while the locking means are maintained released by said second recited valve means and fluid flow to and from said actuator is permitted by said first recited valve means.

2. The combination set forth in claim 1 wherein the pair of servo actuated plunger valves of said first recited valve means are mounted in a pair of servo chambers, and wherein spring means operatively associated with said plungers oppose movement of the said plungers to a position where they trap fluid in said cylinder until a predetermined pressure potential is attained in said servo chambers.

3. A control system for a fluid pressure operated actuator having a cylinder with a lineally movable member therein capable of fluid pressure actuation in either direction and releasable locking means normally operative to restrain movement of said member in the absence of fluid pressure actuation, including in combination, a source of fluid pressure; valve means operable to trap fluid in said cylinder to prevent movement of said member comprising a pair of servo actuated plunger valves having connection with the source, the actuator cylinder on opposite sides of said member, and with a drain conduit; valve means comprising a third servo actuated plunger valve having connection with the source and with the releasable locking means of the actuator operable to admit fluid under pressure from said source to release said locking means while the actuator member is held against movement by the fluid trapped in said cylinder by the first recited valve means; and valve means operable to admit fluid under pressure to said cylinder on either side of said member and connecting the other side of said cylinder to drain to effect movement of said member while the locking means are maintained released by said second recited valve means and fluid flow to and from said actuator is permitted by said first recited valve means.

4. The combination set forth in claim 3 wherein the third servo actuator plunger valve is mounted in a servo chamber and wherein calibrated spring means operatively associated with said third plunger oppose movement of the said plunger to a position where fluid is admitted to the lock releasing means of the actuator until a predetermined pressure is atttained in the servo chamber.

5. A control system for a fluid pressure operated actuator having a cylinder with a lineally movable member therein capable of fluid pressure actuation in either direction and releasable locking means normally operative to restrain movement of said member in the absence of fluid pressure actuation, including in combination, a source of fluid pressure; valve means operable to trap fluid in said cylinder to prevent movement of said member comprising a pair of servo actuated plunger valves having connection with the source, the actuator cylinder on opposite sides of said member, and with a drain conduit; valve means operable to admit fluid under pressure from said source to release said locking means while the actuator member is held against movement by the fluid trapped in said cylinder by the first recited valve means; and valve means comprising a manually operable control valve having connection with the source and said first and second recited valve means operable to admit fluid under pressure to said cylinder on either side of said member and connecting the other side of said cylinder to drain to effect movement of said member while the locking means are maintained released by said second valve means and fluid flow to and from said actuator is permitted by said first recited valve means.

6. The combination set forth in claim 5 wherein the connection between said manually operable control valve and said first and second recited valve means include a pressure responsive shuttle valve which controls the supply and drain connections of said first recited valve means to effect movement of said actuator member in the direction selected by said manually operable control valve.

7. A unitary fluid flow control valve assembly for an actuator including, a housing having openings constituting a pair of fluid inlet ports, a drain port, and fluid outlet ports, said outlet ports having connection with the interior of said actuator, a plurality of recesses in said housing, one of said recesses having connections with said inlet ports, the other of said recesses each having connection with an outlet port and with the drain port, a pressure responsive valve element slidable in said one recess, a spring loaded plunger movably mounted in each of said other recesses, and passage means interconnecting said one recess and said other recesses.

8. The combination set forth in claim 7 wherein said other recesses are interconnected by a common passage in said housing with said drain port.

9. The combination set forth in claim 7 wherein said other recesses are three in number, and wherein said housing includes passage means connecting one of said three recesses to the other two recesses to supply fluid for servo actuation of the plungers slidably disposed in said two receses.

10. The combination set forth in claim 9 wherein each of the plungers in said three recesses is biased against a positive stop by its own spring, each spring being mounted in a chamber aligned with its respective recess, and wherein the valve chambers are connected by passage means to the drain port of the valve housing.

References Cited in the file of this patent

UNITED STATES PATENTS

| | | |
|---|---|---|
| 2,130,618 | Gnavi | Sept. 20, 1938 |
| 2,588,166 | Sacchini | Mar. 4, 1952 |